United States Patent
Lin

(10) Patent No.: US 7,738,572 B2
(45) Date of Patent: Jun. 15, 2010

(54) ORTHOGONAL FREQUENCY DIVISION MULTIPLEXING (OFDM) RECEIVER CAPABLE OF CORRECTING IN-PHASE AND QUADRATURE-PHASE MISMATCH AND METHOD THEREOF

(75) Inventor: Chia-Liang Lin, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1189 days.

(21) Appl. No.: 11/162,046

(22) Filed: Aug. 26, 2005

(65) Prior Publication Data

US 2006/0078058 A1   Apr. 13, 2006

Related U.S. Application Data

(60) Provisional application No. 60/522,538, filed on Oct. 11, 2004.

(51) Int. Cl.
H04K 1/10 (2006.01)
H04L 27/28 (2006.01)
(52) U.S. Cl. .................. 375/260; 375/336; 375/346
(58) Field of Classification Search ............... 375/320, 375/336, 346
See application file for complete search history.

(56) References Cited

U.S. PATENT DOCUMENTS

| 5,263,196 | A | 11/1993 | Jasper |
| 5,414,728 | A | 5/1995 | Zehavi |
| 5,953,311 | A | 9/1999 | Davies |
| 6,462,626 | B1 | 10/2002 | Gharpurey |
| 6,535,560 | B1 | 3/2003 | Masenten |
| 6,977,977 | B1 * | 12/2005 | Dubrovin et al. ............ 375/346 |
| 2003/0053563 | A1 | 3/2003 | Mohindra |
| 2003/0072393 | A1 | 4/2003 | Gu |
| 2004/0092241 | A1 | 5/2004 | Kim |
| 2005/0008101 | A1 * | 1/2005 | Kazi et al. .................. 375/330 |
| 2006/0078058 | A1 * | 4/2006 | Lin ............................ 375/260 |

FOREIGN PATENT DOCUMENTS

| EP | 1 376 967 A2 | 1/2004 |
| TW | 306100 | 5/1997 |
| TW | 363321 | 7/1999 |
| TW | 448628 | 8/2001 |
| WO | 03/013191 A2 | 2/2003 |

* cited by examiner

Primary Examiner—David C Payne
Assistant Examiner—Tanmay K Shah
(74) Attorney, Agent, or Firm—Thomas, Kayden, Horstemeyer & Risley

(57) ABSTRACT

An OFDM receiver includes a demodulator unit being coupled to a received signal for demodulating both an in-phase (I) component and a quadrature-phase (Q) component of the received signal; a serial to parallel unit for converting the output of the demodulator to a plurality of parallel paths, each path corresponding to a particular tone and having a plurality of time-domain samples; a fast Fourier transform circuit for generating frequency domain samples from the time-domain samples; and a equalization and I-Q mismatch correction circuit being coupled to the fast Fourier transform circuit for performing both frequency domain equalization and I-Q mismatch correction on at least one frequency domain sample being output by the fast Fourier transform circuit.

15 Claims, 11 Drawing Sheets

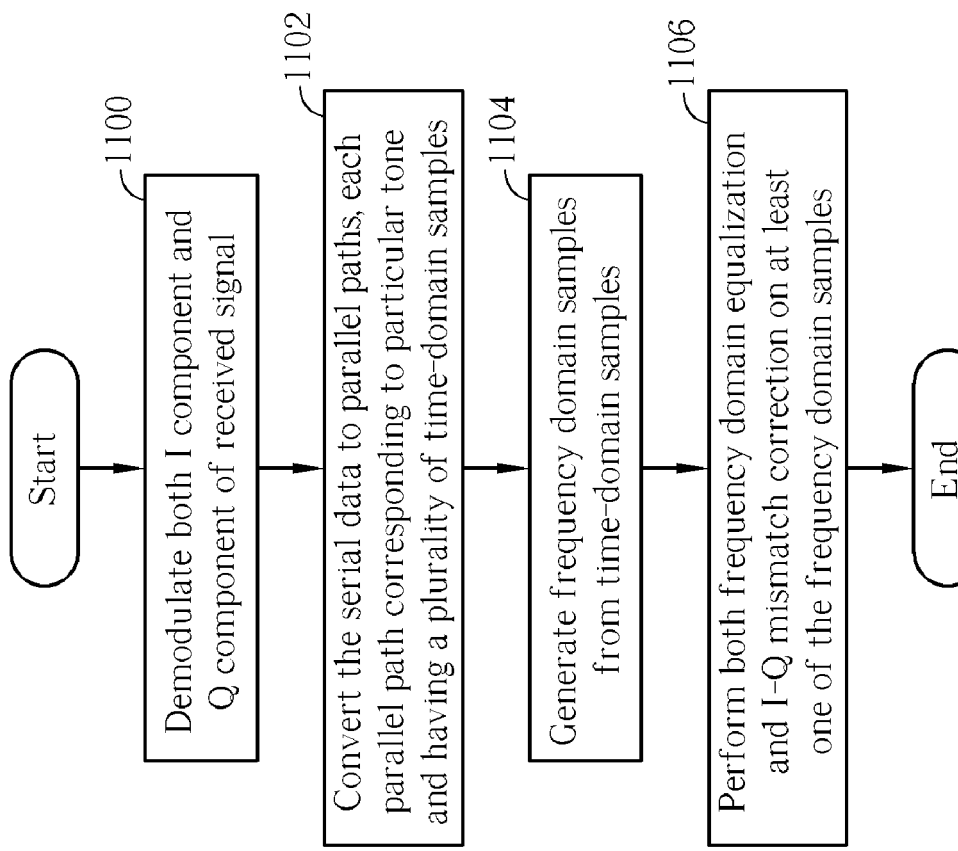

ORTHOGONAL FREQUENCY DIVISION MULTIPLEXING (OFDM) RECEIVER CAPABLE OF CORRECTING IN-PHASE AND QUADRATURE-PHASE MISMATCH AND METHOD THEREOF

CROSS REFERENCE TO RELATED APPLICATIONS

This application claims the benefit of U.S. Provisional Application No. 60/522,538, filed Oct. 11, 2004, entitled "Quadrature Mismatch Correction for OFDM Receiver" and included herein by reference.

BACKGROUND OF THE INVENTION

1. Field of the Invention

The invention relates to a wireless communication system, and more particularly, to a receiver of the wireless communication system.

2. Description of the Prior Art

Orthogonal Frequency Division Multiplexing (OFDM) is a multi-carrier transmission scheme used in high-speed data communications (e.g., both the IEEE 802.11a and 802.11g wireless LAN standards use OFDM). An OFDM transmitter utilizes a plurality of tones, also known as sub-carriers, which are sinusoidal waves and are orthogonal to one another. Each tone carries a certain bit-load of information using a certain modulation scheme, such as binary phase shift key (BPSK) that carries 1-bit of information, quadrature phase shift key (QPSK) that is also known as 4-QAM and carries 2-bits of information, 16-points quadrature amplitude modulation (16-QAM) that carries 4-bits of information, 64-points quadrature amplitude modulation (64-QAM) that carries 6-bits of information, and so on.

FIG. 1 shows a block diagram of a typical OFDM transmitter 100. In FIG. 1, N tones are utilized for transmission (labeled 0 to N−1). The input serial data is buffered and converted into N parallel data, labeled 0 to N−1 according to the respective bit at the serial in, parallel out (SIPO) buffer 101. A BPSK/QPSK/QAM mapper 102 encodes each of the N parallel data paths into a respective complex number, which represents the in-phase and quadrature components for its respective tone. An N-points Inverse Fast Fourier Transform (IFFT) module 104 is used to generate N time-domain complex samples (labeled 0 to N−1). The last $N_{GI}$ samples of the IFFT output are pre-pended to the beginning of the IFFT output. This process is referred to as "circular prefix" and is used to form a guard interval. Note that the guard interval is used to provide a time-domain buffer between adjacent OFDM symbols so as to improve the receiver's immunity to ISI (inter-symbol interference). The resultant (N+$N_{GI}$) samples form an OFDM symbol, consisting of the superposition of N tones in time domain, each tone carrying its respective information. These samples are converted into serial time-domain samples in the subsequent parallel in, serial out (PISO) buffer 108.

The (N+$N_{GI}$) serial time-domain samples are complex data, which can be separated into an in-phase component (real part) and a quadrature-phase component (imaginary part). Both components are converted to an analog signal at their respective digital-analog converter (DAC) 112, 118, resulting in an in-phase signal I(t) and a quadrature signal Q(t). A local oscillator (not shown) generates a quadrature carrier pair, cos(wt) and −sin(wt), which are used to modulate I(t) and Q(t), respectively. The resultant RF signals are summed, amplified, and transmitted to the receiver via the channel, which could be either a wireless medium or a transmission line.

FIG. 2 shows a block diagram of a typical OFDM receiver 200. As shown in FIG. 2, the received signal is amplified by a low noise amplifier 202, separated into I-path and Q-path, and then demodulated by a quadrature carrier pair (i.e., cos(wt) and −sin(wt)). Low pass filtering (LPF) is performed on both the in-phase and quadrature-phase paths to provide an anti-aliasing function before the I-Q signals are converted into digital samples by a pair of analog to digital converters (ADCs) 208, 214. The serial time domain samples obtained from the ADCs 208, 214 form a sequence of serial complex samples. The serial complex samples are buffered and converted by a SIPO 220 into (N+$N_{GI}$) parallel samples, labeled 0 to (N+$N_{GI}$−1) in FIG. 2. The guard interval samples are removed, resulting in N complex samples, again labeled 0 to (N−1). A subsequent N-points Fast Fourier Transform (FFT) 224 generates N frequency domain samples from the N time-domain samples. The frequency domain samples are adjusted in both magnitude and phase by a subsequent frequency-domain equalizer (FEQ) 226 to compensate for the amplitude change and phase shift caused by the channel on a per-tone basis. A per-tone decision on each of the N FEQ outputs is made in the subsequent BPSK/QPSK/QAM demapper 228, resulting in N parallel data paths, where each data path carries a certain bit-load of information. The N parallel data are then converted into serial data by a subsequent PISO 230.

In practice, the OFDM receiver 200 suffers from a phenomenon known as the quadrature mismatch (or I-Q mismatch) problem. As shown in FIG. 3, the quadrature carrier pair generated by a local oscillator 300 within the receiver exhibits a slight phase mismatch. Therefore, instead of generating cos(wt) and −sin(wt) differing perfectly by 90 degrees, the local oscillator 300 generates cos(wt) and −sin(wt+δ). The circuit blocks on the I-path (LPF1 206 and ADC1 208) will also be slightly different from those on the Q-path (LPF2 212 and ADC2 214), as they are all subject to limited component tolerances. These differences and the non 90 degree phase difference both result in I-Q mismatch. To account for the I-Q mismatch, some compensation needs to be performed within the receiver 200.

FIG. 4 shows a typical I-Q mismatch correction circuit 400 according to a first correction scheme of the related art. An amplitude mismatch estimate block 404 is used to estimate the amplitude mismatch between the I and Q paths and to accordingly adjust the gain of one of the paths (e.g., the Q-path in this example) to thereby compensate for the amplitude mismatch. A phase mismatch estimate block 406 is used to estimate the phase mismatch between the I and Q paths and to accordingly adjust the delay on one of the quadrature carrier pair (e.g., again the Q-path in this example) to thereby compensate for the phase mismatch.

FIG. 5 shows another I-Q mismatch correction circuit 500 according to a second correction scheme of the related art. In this circuit 500, instead of physically adjusting the phase of the quadrature carrier pair, both the amplitude mismatch A and the phase mismatch a are estimated. One path (e.g., the Q-path in this example) is scaled by a factor of G2=1/[A×cos (a)] to correct the slight amplitude reduction due to amplitude and phase mismatch, and the cross coupling contribution from this path (i.e., the coupling factor of G2=tan(a) is subtracted from the other path (i.e., the I-path in this example). In doing so, the distortion due to phase mismatch, which is basically I-Q coupling, is removed.

However, the prior art I-Q mismatch correction schemes of FIG. 4 and FIG. 5 have the drawback that they cannot effectively correct I-Q mismatch if the mismatch is frequency dependent. Frequency dependency of the I-Q mismatch problem is particularly pronounced in wide-band applications where the circuit elements need to process a wide range of frequency components. Therefore, an improved method of correcting I-Q mismatch in an OFDM receiver would be desirable.

SUMMARY OF THE INVENTION

One objective of the claimed invention is therefore to provide a receiver capable of correcting in-phase and quadrature-phase mismatch, to solve the above-mentioned problem.

According to an exemplary embodiment of the claimed invention, a receiver is disclosed comprising a demodulator unit being coupled to a received signal for demodulating both an in-phase (I) component and a quadrature-phase (Q) component of time-domain serial data of the received signal; a serial to parallel unit for converting the serial output of the demodulator to a plurality of parallel paths; a fast Fourier transform circuit for generating frequency domain samples from the time-domain samples; and a frequency domain equalization and I-Q mismatch correction circuit being coupled to the fast Fourier transform circuit for performing both frequency domain equalization and I-Q mismatch correction on at least one frequency domain sample being output by the fast Fourier transform circuit.

According to another exemplary embodiment of the claimed invention, a method of processing a received signal in a receiver is disclosed comprising demodulating both an in-phase (I) component and a quadrature-phase (Q) component of the time domain serial data of the received signal to thereby generate I and Q serial paths; converting the serial paths to a plurality of parallel paths; generating frequency domain samples from the time-domain samples; and performing both frequency domain equalization and I-Q mismatch correction on at least one of the frequency domain samples.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 11 shows a generalized method of processing a received signal in an OFDM receiver according to the present invention.

DETAILED DESCRIPTION

Figure 1:
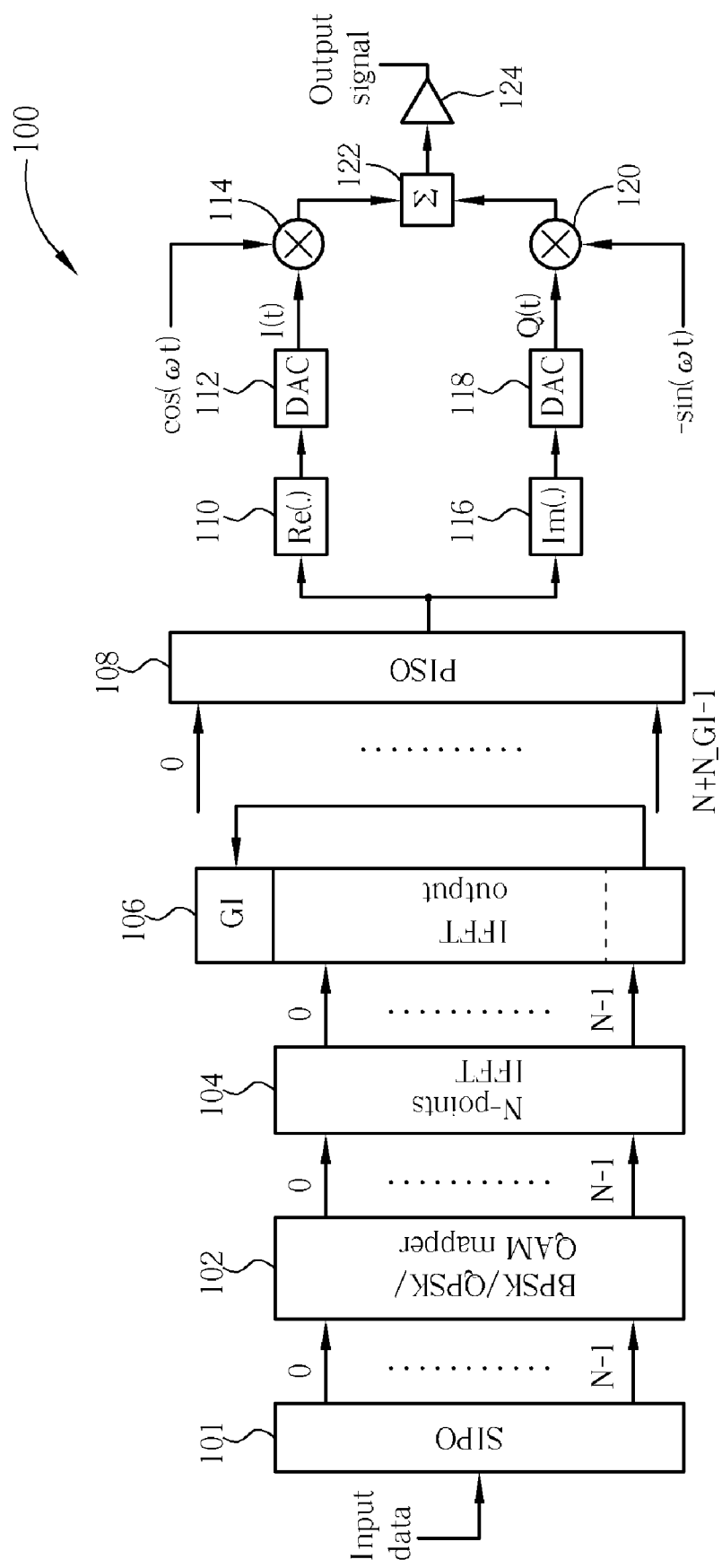
FIG. 1 shows a block diagram of a typical OFDM transmitter.
Figure 2:
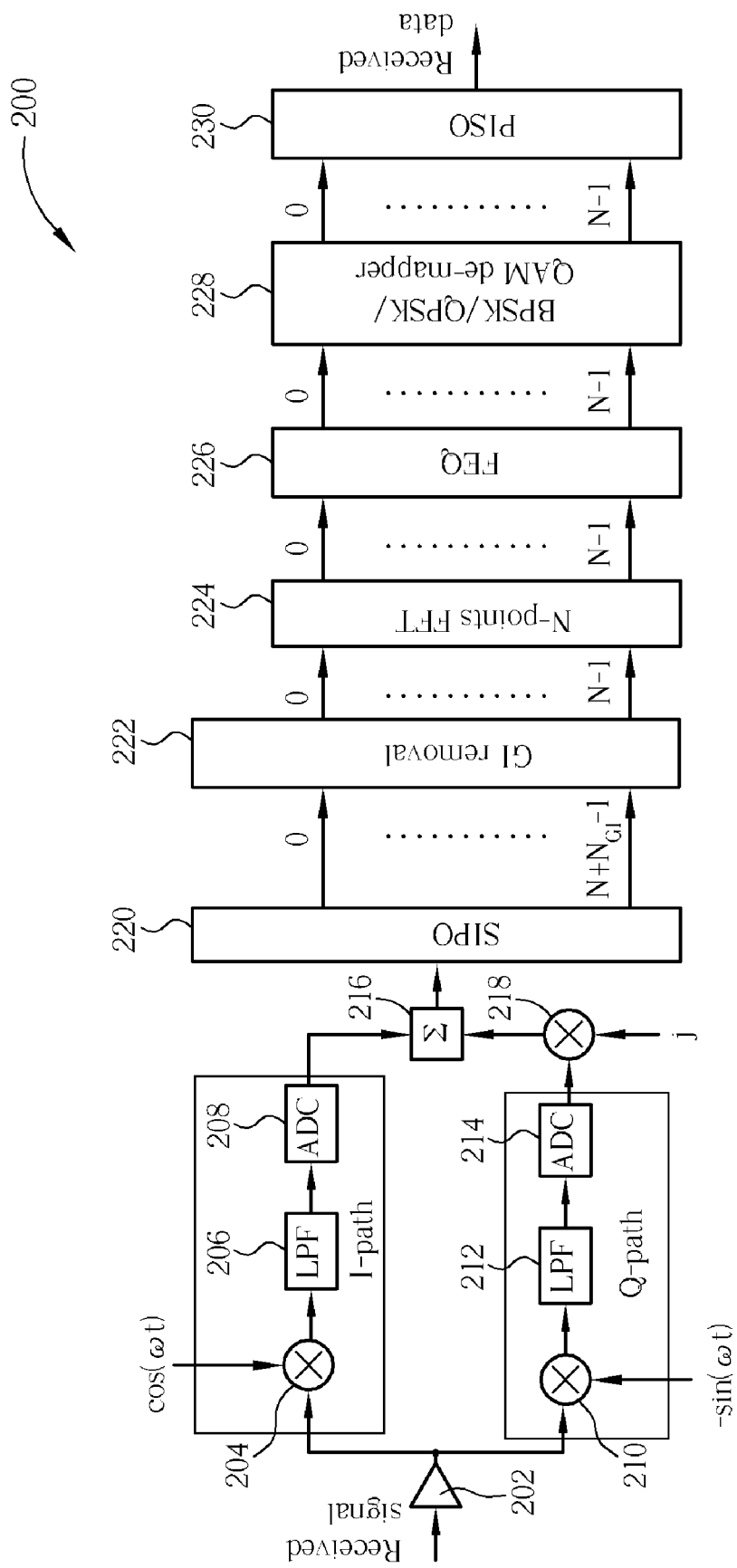
FIG. 2 shows a block diagram of a typical OFDM receiver.
Figure 3:
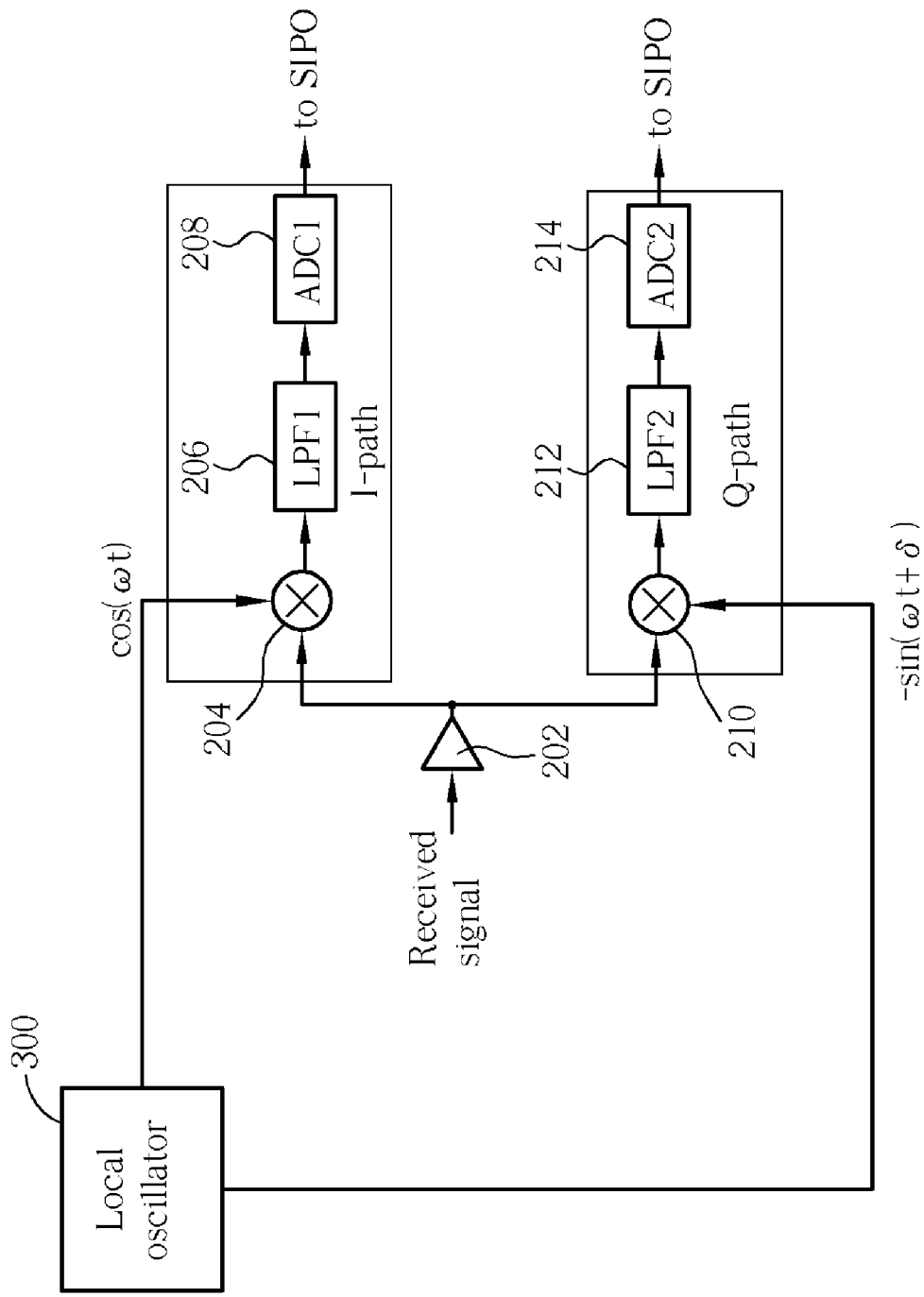
FIG. 3 shows how the quadrature carrier pair generated by a local oscillator within the receiver of FIG. 2 exhibits a slight phase mismatch.
Figure 6:
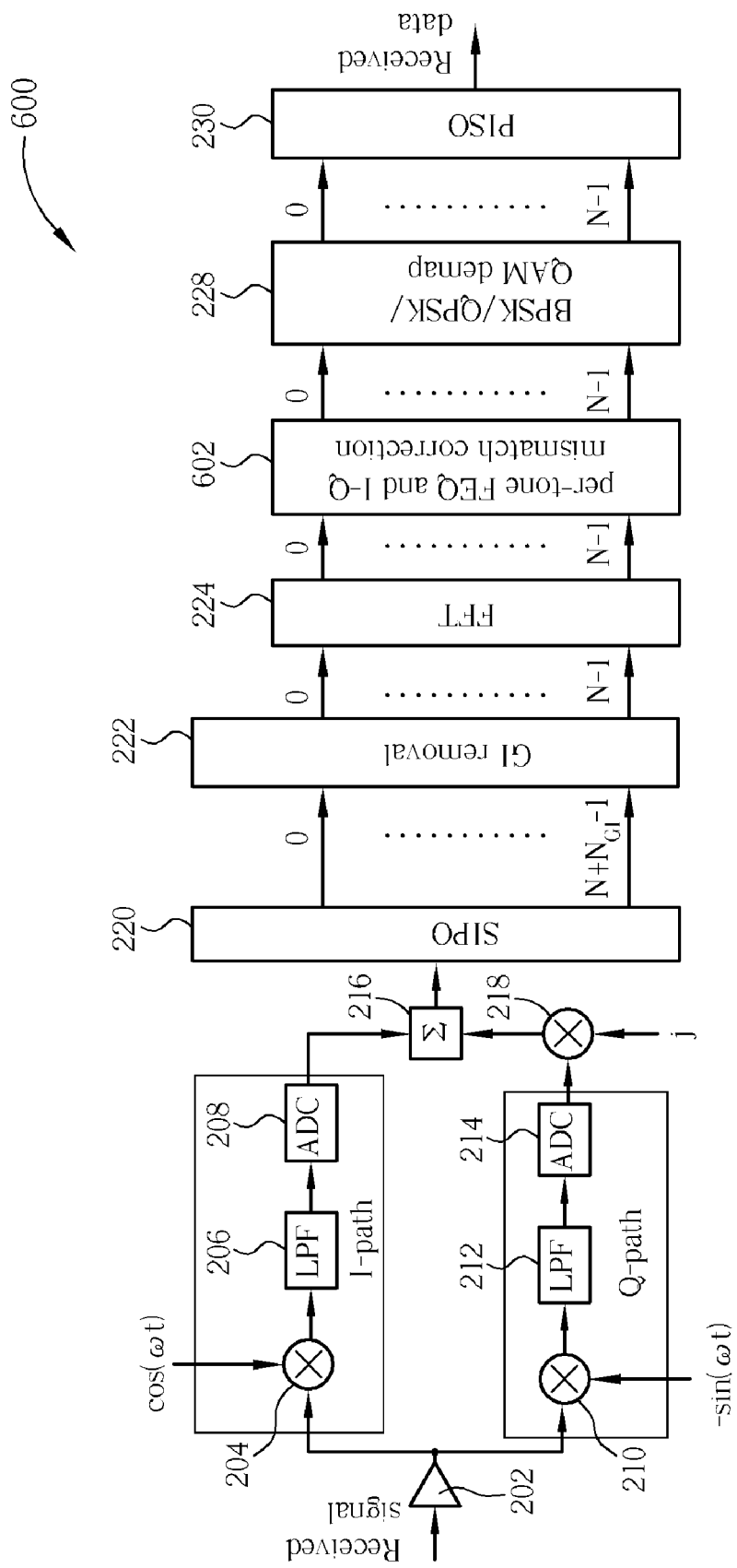
FIG. 6 shows a block diagram of an OFDM receiver according to a first exemplary embodiment of the present invention.

FIG. 6 shows a block diagram of an OFDM receiver 600 according to a first exemplary embodiment of the present invention. The components shown in FIG. 6 are very similar to the components shown in FIG. 2; however, according to the present invention, the frequency-domain equalizer 226 of FIG. 2 is replaced with an FEQ and I-Q mismatch correction circuit 602. In this embodiment, the FEQ and I-Q mismatch correction circuit 602 performs frequency domain equalization and I-Q mismatch correction on a per-tone basis in order to correct both the respective channel distortion and any I-Q mismatch that is experienced by the tone. The per-tone correction is applied to the frequency domain samples outputted by the FFT 224 to take advantage of the orthogonal characteristic of the received signal.

Figure 7:
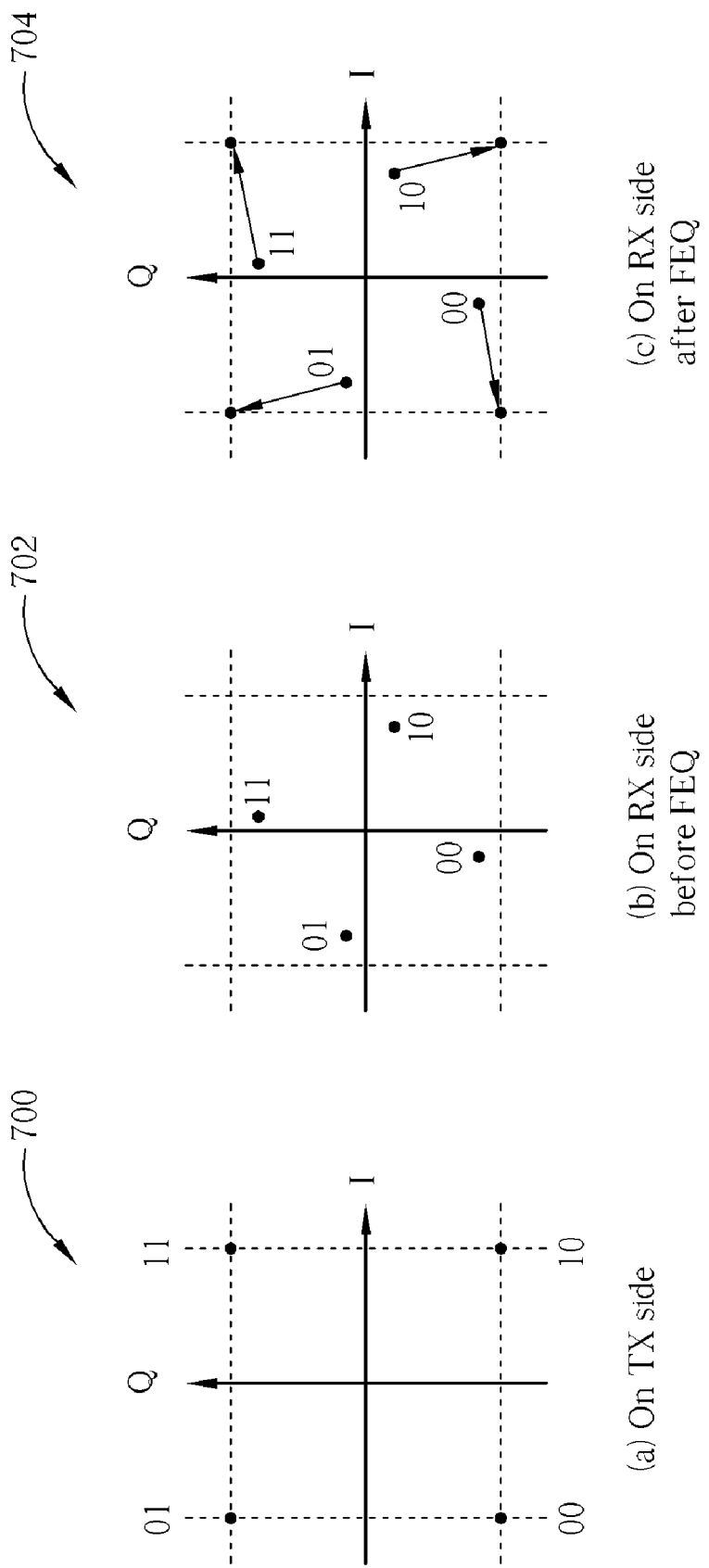
FIG. 7 shows constellation diagrams of a 4-QAM signal outputted by the transmitter of FIG. 1, received at the receiver of FIG. 2, and after the FEQ in the receiver of FIG. 2.

In order to better explain the operation of the per-tone equalization and correction performed by the FEQ and I-Q mismatch correction circuit 602, it is useful to first look at the operation of a typical FEQ such as the FEQ 226 of FIG. 2. For example, consider a 4-QAM modulation on one tone. FIG. 7 shows constellation diagrams of a 4-QAM signal outputted by the transmitter 100, received at the receiver 200, and after the FEQ 226 in the receiver 200. The 4-QAM mapper 102 maps two bits of data into 4 constellation points. For instance, "00" is mapped to (−1, −1) and "10" is mapped to (1, −1). The 4 constellation points (−1, −1), (−1, 1), (1, −1), and (1, 1) form a square on the TX side, as shown in constellation diagram 700 in FIG. 7. However, the channel alters both the amplitude and the phase so the square formed by the 4 constellation points is scaled and rotated, as shown in constellation diagram 702. The typical FEQ 226 scales and rotates the constellation points back to the original location, as shown in constellation diagram 704.

Mathematically, the output of the FFT 224 can be represented by an N-element complex column vector r.

$$r = \begin{bmatrix} r_0 \\ r_1 \\ \vdots \\ r_{N-1} \end{bmatrix} = \begin{bmatrix} \operatorname{Re}(r_0) \\ \operatorname{Re}(r_1) \\ \vdots \\ \operatorname{Re}(r_{N-1}) \end{bmatrix} + j \cdot \begin{bmatrix} \operatorname{Im}(r_0) \\ \operatorname{Im}(r_1) \\ \vdots \\ \operatorname{Im}(r_{N-1}) \end{bmatrix}$$

Similarly, the output of the FEQ 226 can be represented by an N-element complex column vector s.

$$s = \begin{bmatrix} s_0 \\ s_1 \\ \vdots \\ s_{N-1} \end{bmatrix} = \begin{bmatrix} \operatorname{Re}(s_0) \\ \operatorname{Re}(s_1) \\ \vdots \\ \operatorname{Re}(s_{N-1}) \end{bmatrix} + j \cdot \begin{bmatrix} \operatorname{Im}(s_0) \\ \operatorname{Im}(s_1) \\ \vdots \\ \operatorname{Im}(s_{N-1}) \end{bmatrix}$$

The FEQ 226 maps r into s on a per-tone basis. For example, consider tone i (for i=0, . . . , N−1), the FEQ 226 scales the amplitude by a factor of $A_i$ and rotates the phase by $\theta_i$. Mathematically, this is a matrix operation described as follows:

$$\begin{bmatrix} \text{Re}(s_i) \\ \text{Im}(s_i) \end{bmatrix} = \begin{bmatrix} A_i \cos\theta_i & -A_i \sin\theta_i \\ A_i \sin\theta_i & A_i \cos\theta_i \end{bmatrix} \begin{bmatrix} \text{Re}(r_i) \\ \text{Im}(r_i) \end{bmatrix}$$

Note that the matrix that represents the per-tone mapping has only two degrees of freedom, $A_i$ and $\theta_i$, although it is a 4-elements (2 by 2) matrix.

It is convenient to define $F_i \equiv A_i \exp(j\theta_i)$, then the per-tone FEQ function can be described by:

$$\begin{bmatrix} \text{Re}(s_i) \\ \text{Im}(s_i) \end{bmatrix} = \begin{bmatrix} \text{Re}(F_i) & -\text{Im}(F_i) \\ \text{Im}(F_i) & \text{Re}(F_i) \end{bmatrix} \begin{bmatrix} \text{Re}(r_i) \\ \text{Im}(r_i) \end{bmatrix}$$

Figure 8:
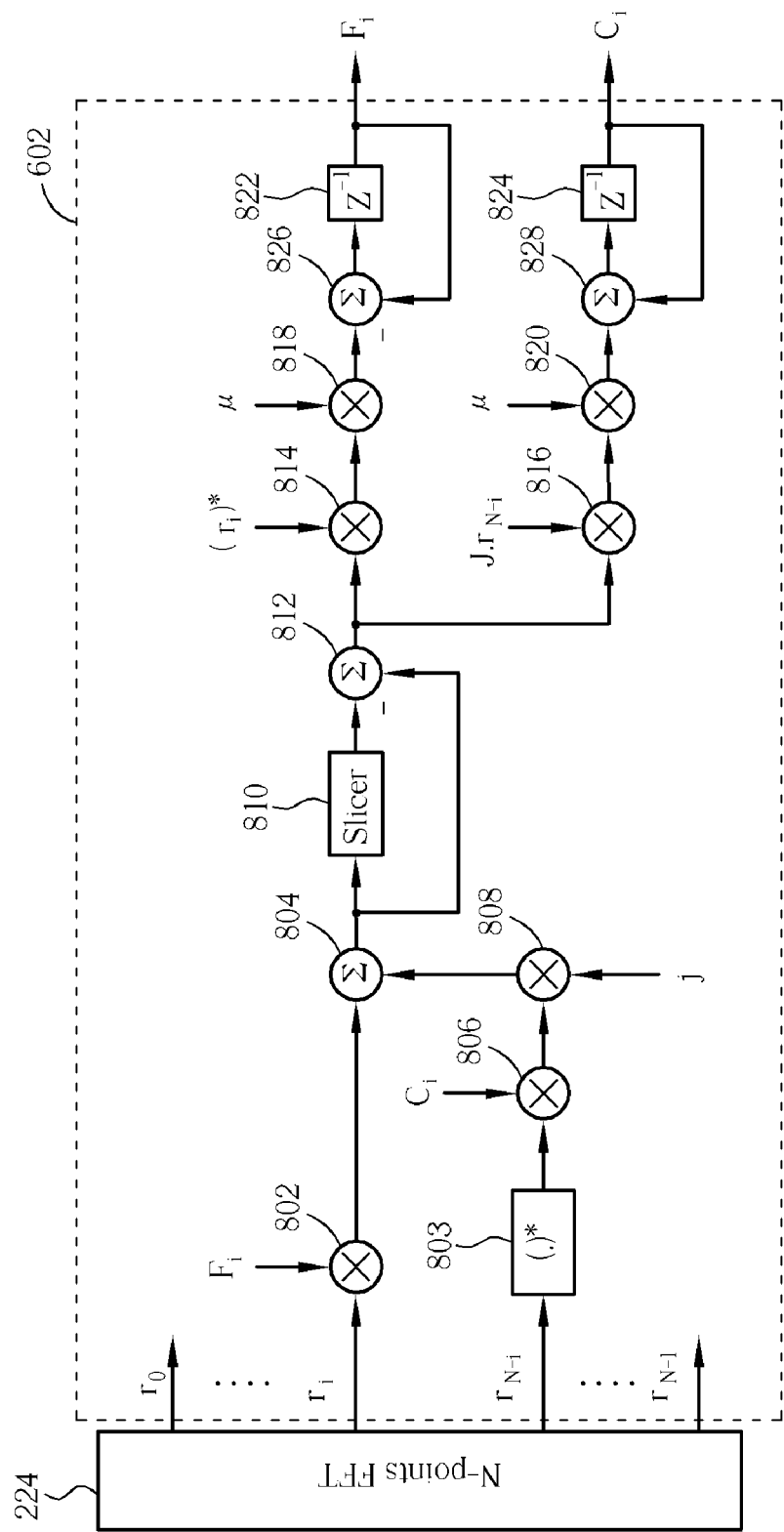
FIG. 8 shows an expanded block diagram of the FEQ and I-Q mismatch correction circuit of FIG. 6 according to an exemplary embodiment.

FIG. 8 shows an expanded block diagram of the FEQ and I-Q mismatch correction circuit 602 according to an exemplary embodiment. As shown in FIG. 8, multiplier 802 is coupled to an $i^{th}$ frequency domain sample from the fast Fourier transform circuit 224 for multiplying the $i^{th}$ frequency domain sample with a first correction factor $F_1$. A complex conjugate unit 803 is coupled to an $(N-i)^{th}$ frequency domain sample from the fast Fourier transform circuit 224 for calculating a complex conjugate of the $(N-i)^{th}$ frequency domain sample. Note that N corresponds to the number of frequency domain samples being output by the fast Fourier transform circuit 224. Multiplier 806 is coupled to the complex conjugate unit 803 for multiplying the output of the complex conjugate unit 803 with a second correction factor $C_i$. The output of multiplier 806 is multiplied by square root of minus one in a subsequent multiplier 808. An adder 804 is coupled to the multipliers 802 and 808 for summing the outputs of the multipliers 802, 808 to thereby generate an output value being both frequency domain equalized and I-Q mismatch corrected for the $i^{th}$ frequency domain sample.

To generate the first and second correction factors, a slicer 810 receives the output value of the adder 804 to determine a most likely constellation point corresponding to the $i^{th}$ frequency domain sample. A subtractor 812 is coupled to the output value of adder 804 and of the slicer 810 for finding a difference between the most likely constellation point and a current constellation point. That is, the output of the subtractor 812 corresponds to a current error value. Multiplier 814 multiplies the output of the subtractor 812 with a complex conjugate of the $i^{th}$ frequency domain sample, and multiplier 818 multiplies the output of the multiplier 814 with an adaptation step. Multiplier 816 multiplies the output of the subtractor 812 with the square root of minus one and the $(N-i)^{th}$ frequency domain sample, and multiplier 820 multiplies the output of multiplier 816 with an adaptation step. As will be apparent to a person of ordinary skill in the art, the order of the above-described connections can be changed while still having a functionally equivalent circuit. Additionally, it should be noted that the adaptation step corresponds to an iteration step size utilized to control the speed of the frequency domain equalization and I-Q mismatch correction circuit. A larger adaptation step will lead to faster performance at the expense of accuracy.

A first delay unit 822 is provides a unit delay, while subtractor 826 subtracts the output of multiplier 818 from the output of the first delay unit 822. A second delay unit 824 provides a unit delay, while adder 828 sums the output of multiplier 820 and the output of the second delay unit 824. In this embodiment, the output of the first delay unit 822 is the first correction factor $F_i$, and the output of the second delay unit 824 is the second correction factor $C_i$.

In the above description, the slicer unit 810 is a function that rounds off a "soft decision" of the FEQ to the nearest ideal constellation point (e.g. (1, −1)) to obtain a "hard decision". Some systems allow a training period during which the correct hard decision is readily known. In this case, the pre-known correct hard decision is used instead of obtaining a hard decision from the slicer unit 810.

Figure 9:
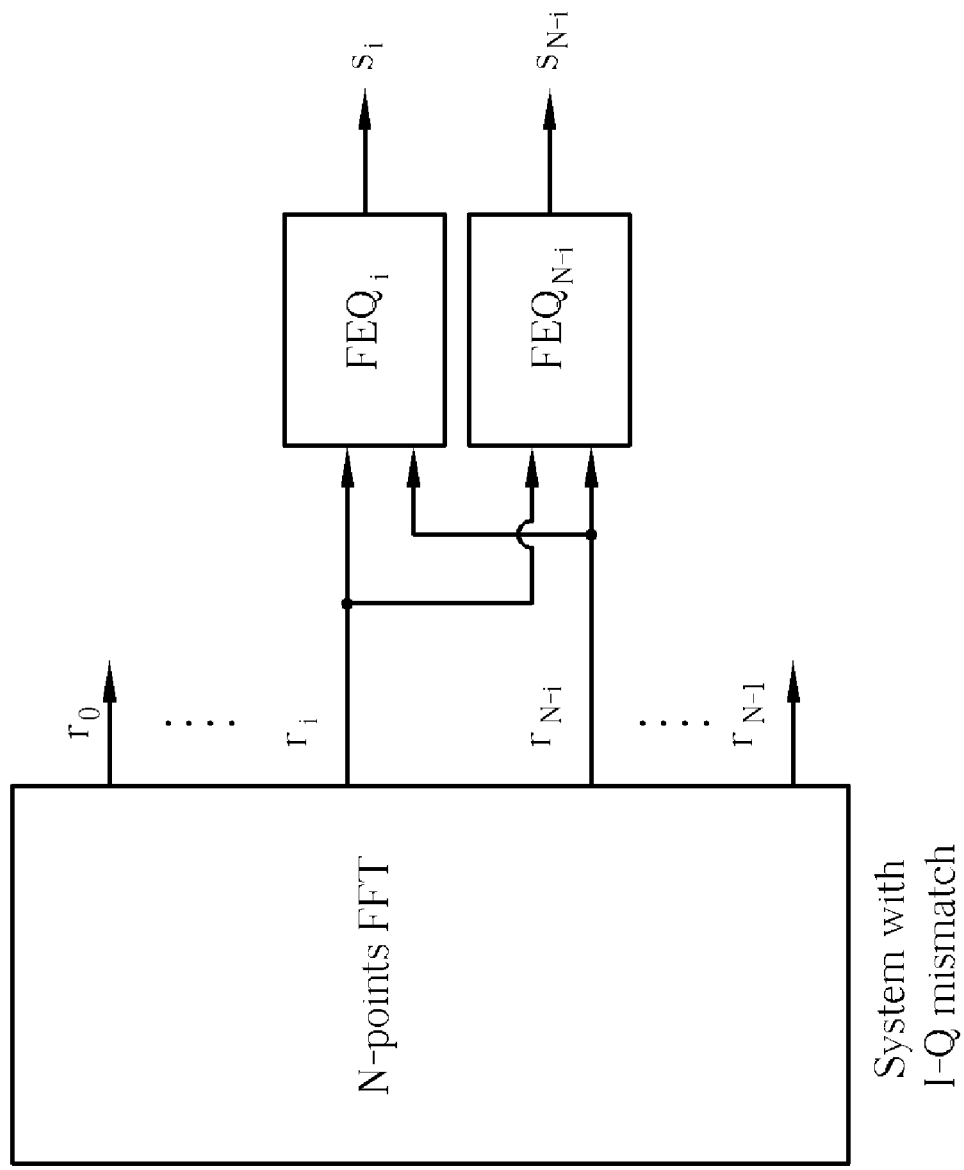
FIG. 9 shows equalization being performed as a pair in the FEQ and I-Q mismatch correction circuit of FIG. 6.

It is well known in the art that I-Q mismatch leads to image coupling. In an N-tone OFDM system, the image of tone i is tone (N-i). In an I-Q mismatch free system, there will be no coupling between tones (since all tones are orthogonal to one another), and therefore each tone can be equalized independently. However, in a system suffering from I-Q mismatch, each tone is coupled to its image tone and therefore must be equalized together, as shown in FIG. 9.

In the following description, the FEQ 602 input for tone i $\text{ber}_i = \text{Re}(r_i) + j \cdot \text{Im}(r_i)$ is referred to as the "raw decision." The FEQ 602 output $s_i = \text{Re}(s_i) + j \cdot \text{Im}(s_i)$ is referred to as the "soft decision." And the correct constellation point, which should be identical to what has been transmitted on the TX side, $h_i = \text{Re}(h_i) + j \cdot \text{Im}(h_i)$ is referred to as the "hard decision." Using these terms, the FEQ 602 maps the raw decision into the soft decision according to the following relation:

$$\begin{bmatrix} \text{Re}(s_i) \\ \text{Im}(s_i) \end{bmatrix} = \begin{bmatrix} \text{Re}[F_i] & -\text{Im}[F_i] \\ \text{Im}[F_i] & \text{Re}[F_i] \end{bmatrix} \begin{bmatrix} \text{Re}(r_i) \\ \text{Im}(r_i) \end{bmatrix} + \begin{bmatrix} -\text{Im}[C_i] & \text{Re}[C_i] \\ \text{Re}[C_i] & \text{Im}[C_i] \end{bmatrix} \begin{bmatrix} \text{Re}(r_{N-i}) \\ \text{Im}(r_{N-i}) \end{bmatrix}$$

Or simply:

$$s_i = F_i \cdot r_i + j \cdot C_i \cdot (r_{N-i})^*$$

where $F_i$ equalizes the channel distortion and $C_i$ equalizes the I-Q mismatch.

The correction factor coefficients $F_i$ and $C_i$ can be obtained using LMS algorithm. Let the difference between the soft decision and hard decision, referred to as the "decision error," be $e_i = s_i - h_i = (\text{Re}(s_i) - \text{Re}(h_i)) + j \cdot i \cdot (\text{Im}(s_i) - \text{Im}(h_i))$.

An ideal FEQ will map the raw decision into the soft decision so as to minimize the decision error. An LMS scheme can be used to obtain the FEQ coefficients that will serve exactly this purpose using the following formulas:

$$\text{Re}(F_i^{(next)}) = \text{Re}(F_i^{(current)}) - \mu \cdot [\text{Re}(e_i) \cdot \text{Re}(r_i) + \text{Im}(e_i) \cdot \text{Im}(r_i)]$$

$$\text{Im}(F_i^{(next)}) = \text{Im}(F_i^{(current)}) - \mu \cdot [\text{Im}(e_i) \cdot \text{Re}(r_i) - \text{Re}(e_i) \cdot \text{Im}(r_i)]$$

$$\text{Re}(C_i^{(next)}) = \text{Re}(C_i^{(current)}) - \mu \cdot [\text{Im}(e_i) \cdot \text{Re}(r_{N-i}) + \text{Re}(e_i) \cdot \text{Im}(r_{N-i})]$$

$$\text{Im}(C_i^{(next)}) = \text{Im}(C_i^{(current)}) - \mu \cdot [\text{Im}(e_i) \cdot \text{Im}(r_{N-i}) - \text{Re}(e_i) \cdot \text{Re}(r_{N-i})]$$

Or, simply:

$$F_i^{(next)} = F_i^{(current)} - \mu \cdot e_i \cdot (r_i)^*$$

$$C_i^{(next)} = C_i^{(current)} + j \cdot \mu \cdot e_i \cdot r_{N-i}$$

where $\mu$ is a constant that specifies the step size of the LMS adaptation. In this manner, the FEQ coefficients $F_i$ and $C_i$ are continuously adjusted to minimize the decision error. That is, the original constellation points are restored and the combined effects of channel distortion and I-Q mismatch are corrected.

Note that there are only two degrees of freedom, Re(Fi) and Im(Fi), in the conventional FEQ 226, because the conventional FEQ 226 is meant to correct channel distortion that involves two degrees of freedom: amplitude change and phase shift caused by the channel. According to this embodiment, there are 4 degrees of freedom in the FEQ and I-Q mismatch correction circuit 602: Re(Fi), Im(Fi), Re(Ci) and Im(Ci), because both channel distortion and I-Q mismatch are corrected. That is, 4 degrees of freedom are involved and include: amplitude change, phase shift, amplitude mismatch, and phase mismatch. Since the FEQ and I-Q mismatch correction circuit 602 performs operations on a per-tone basis, each tone has its respective FEQ coefficients to correct the respective channel distortion and I-Q mismatch experienced by this tone. Therefore, the present invention solves the frequency dependent I-Q mismatch problem by performing the I-Q mismatch correction on the frequency domain samples outputted by the FFT 224.

Figure 10:
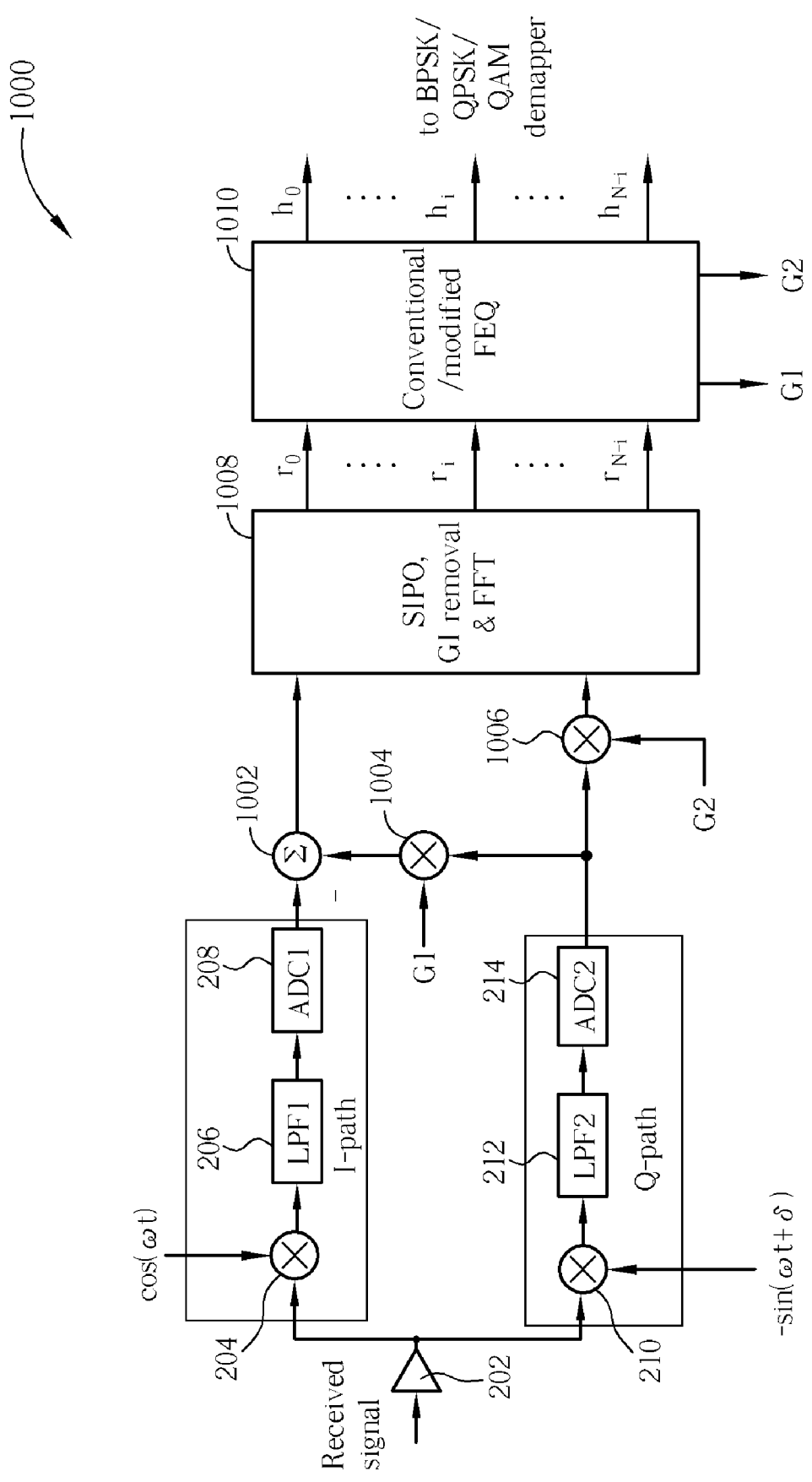
FIG. 10 shows a block diagram of an OFDM receiver according to a second exemplary embodiment of the present invention.

FIG. 10 shows a block diagram of an OFDM transmitter according to a second exemplary embodiment of the present invention. Note that the above-described the per-tone FEQ and I-Q mismatch correction circuit 800 of FIG. 8 can correct I-Q mismatch regardless of whether it is frequency dependent or frequency independent. However, this scheme need not be exclusively utilized on all tones. In some OFDM systems, the I-Q mismatch is basically frequency independent except for a few tones. For instance, the I-Q mismatch due to slight differences in the cut-off frequency of the LPFs 206, 212 in the respective paths exhibits strong frequency dependence only at the frequencies near the cut-off. In this case, the I-Q mismatch correction scheme can be modified to achieve hardware reduction by taking advantage of this property.

Figure 4:
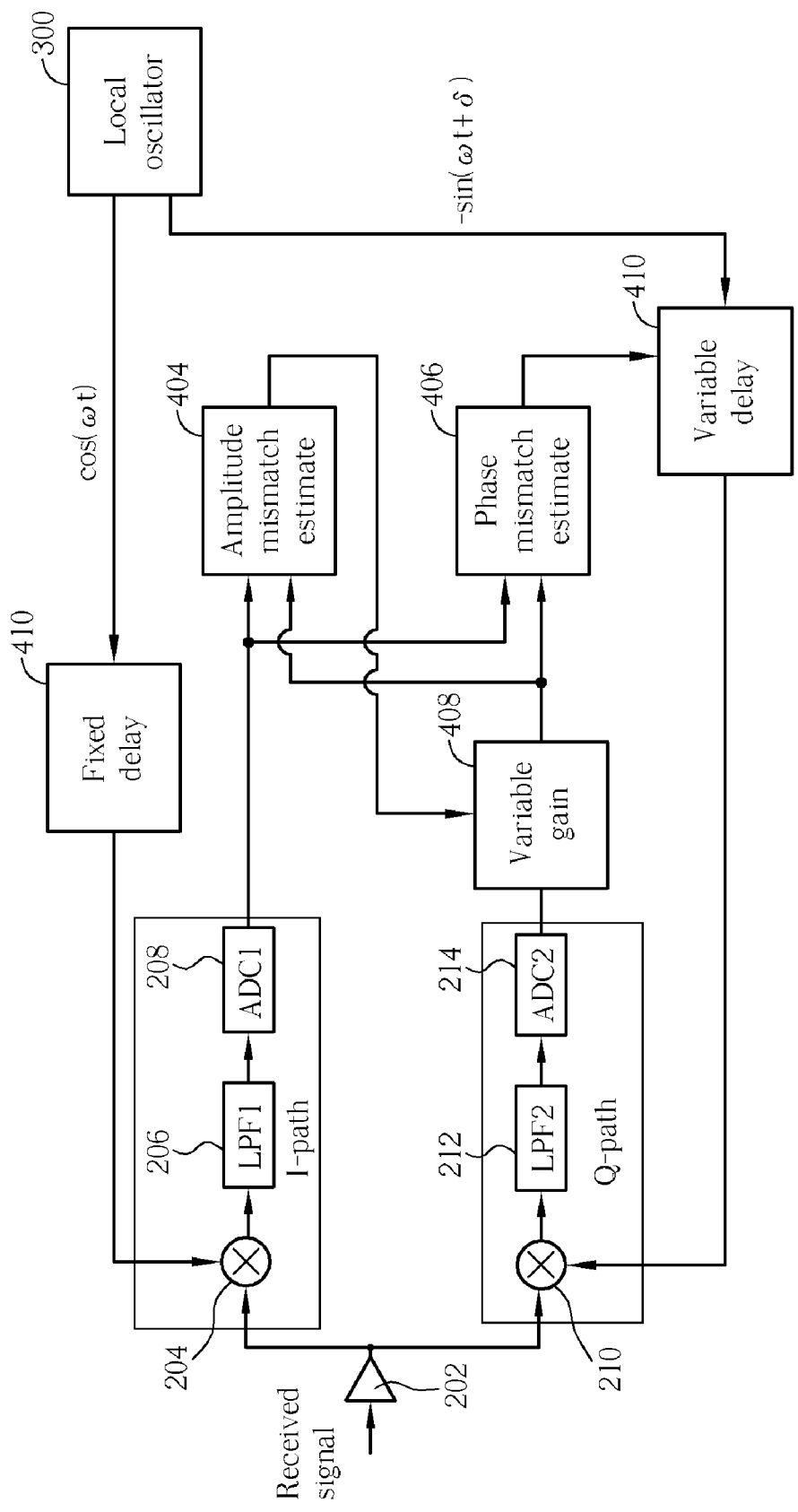
FIG. 4 shows a typical I-Q mismatch correction circuit according to a first correction scheme of the related art.
Figure 5:
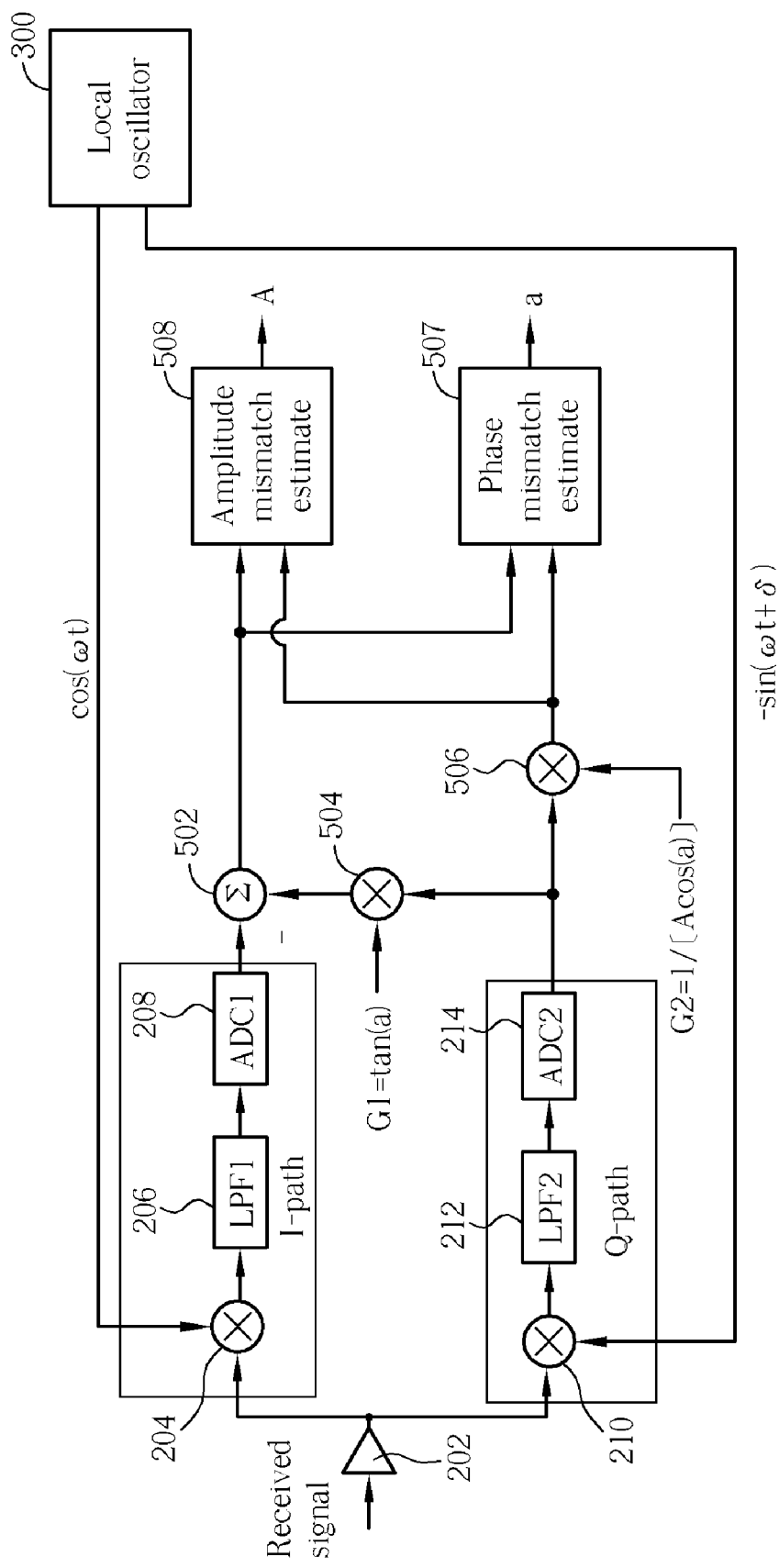
FIG. 5 shows another I-Q mismatch correction circuit according to a second correction scheme of the related art.

Firstly, the tones are separated into two categories: (1) those that have basically the same I-Q mismatch (frequency independent mismatch), and (2) those that have different I-Q mismatch (frequency dependent mismatch). The sorting of tones into the two categories is usually quite straightforward and can be determined upfront once the hardware architecture is defined. For example, tones that are away from the cut-off of LPF 206, 212 belong to category (1), while the tones that are close to cut-off of LPF 206, 212 belong to category (2). For category (1) tones, a universal I-Q mismatch correction scheme such as those employed in the related art of FIG. 4 or FIG. 5 is utilized to correct I-Q mismatch. The channel distortion can be corrected by a conventional FEQ 226, which has only two degrees of freedom. For category (2) tones, a combined channel distortion and I-Q mismatch correction is performed using the per-tone FEQ and I-Q mismatch correction circuit 800 of FIG. 8, which has 4 degrees of freedom. As shown in FIG. 10, two additional multipliers 1004, 1006 and one summer 1002 are used. The multiplier 1004 and summer 1002 involving "G1" corrects the frequency-independent phase mismatch. The multiplier 1006 involving "G2" corrects the frequency-independent amplitude mismatch.

The algorithm for determining "G1" and "G2" is disclosed as follows. "G1" and "G2" need to be adapted so as to minimize the correlation between the decision error and the image decision. A representative tone within category (1), e.g., tone i, is chosen. It should be noted that because the I-Q mismatch is frequency independent in categaroy (1), any of the tones belonging to category (1) can be used as the representative tone. The iterative adaptation for G1 and G2 is implemented by the following formulas:

$$G1^{(next)}=G1^{(current)}-\mu \cdot [Re(e_i)\cdot Im(s_{N-i})+Im(e_i)\cdot Re(s_{N-i})+Re(e_{N-i})\cdot Im(s_i)+Im(e_{N-i})\cdot Re(s_i)]$$

$$G2^{(next)}=G2^{(current)}+\mu \cdot [Re(e_i)\cdot Re(s_{N-i})-Im(e_i)\cdot Im(s_{N-i})+Re(e_{N-i})\cdot Re(s_i)-Im(e_{N-i})\cdot Im(s_i)]$$

where μ is a constant which specifies the adaptation step size (which may be different from that in FEQ adaptation).

For the tones within category (1), a conventional FEQ scheme having two degrees of freedom, i.e, Re($F_i$) and Im($F_i$), is utilized. For example, the iterative adaptation can be implemented as follows:

$$Re(F_i^{(next)})=Re(F_i^{(next)})-\mu \cdot [Re(e_i)\cdot Re(r_i)+Im(e_i)\cdot Im(r_i)]$$

$$Im(F_i^{(next)})=Im(F_i^{(next)})-\mu \cdot [Im(e_i)\cdot Re(r_i)-Re(e_i)\cdot Im(r_i)]$$

where μ is a constant which specifies the adaptation step size.

FIG. 10 shows a block diagram of an OFDM receiver according to a second exemplary embodiment of the present invention. Note that the above-described the per-tone FEQ and I-Q mismatch correction circuit 800 of FIG. 8 can correct I-Q mismatch regardless of whether it is frequency dependent or frequency independent. However, this scheme need not be exclusively utilized on all tones. In some OFDM systems, the I-Q mismatch is basically frequency independent except for a few tones. For instance, the I-Q mismatch due to slight differences in the cut-off frequency of the LPFs 206, 212 in the respective paths exhibits strong frequency dependence only at the frequencies near the cut-off. In this case, the I-Q mismatch correction scheme can be modified to achieve hardware reduction by taking advantage of this property.

FIG. 11 shows a generalized method of processing a received signal in an OFDM receiver according to the present invention. Provided that substantially the same result is achieved, the steps of the flowchart in FIG. 11 need not be in the exact order shown and need not be contiguous, that is, other steps can be intermediate. In this embodiment, the received signal is processed using the following steps:

Step 1100: Demodulate both I component and Q component of the time domain samples of the received signal.

Step 1102: Convert the time-domain serial data to parallel paths.

Step 1104: Generate frequency domain samples from time-domain samples.

Step 1106: Perform both frequency domain equalization and I-Q mismatch correction on at least one of the frequency domain samples.

By performing the frequency domain equalization and I-Q mismatch correction on at least one of the frequency domain samples, the present invention allows frequency dependent I-Q mismatch to be corrected within the OFDM receiver.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver comprising:
   a demodulator for demodulating both an in-phase (I) component and a quadrature-phase (Q) component of a received signal to thereby generate I and Q time-domain serial data;
   a serial to parallel unit for converting the time-domain serial data to a plurality of parallel paths;
   a Fourier transform circuit for generating frequency domain samples from the time-domain samples; and
   an equalization and I-Q mismatch correction circuit being coupled to the Fourier transform circuit for performing both frequency domain equalization and I-Q mismatch correction on at least one frequency domain sample being output by the Fourier transform circuit;

wherein the equalization and I-Q mismatch correction circuit is further for performing the I-Q mismatch correction on a per-tone basis; and wherein each particular tone has respective frequency domain equalization coefficients to correct the respective channel distortion and I-Q mismatch experienced by the particular tone.

2. The receiver of claim 1, wherein the equalization and I-Q mismatch correction circuit has four degrees of freedom being amplitude change and phase shift caused by at least one of channel distortion, and amplitude mismatch and phase mismatch caused by I-Q mismatch.

3. The receiver of claim 1, wherein the equalization and I-Q mismatch correction circuit is further for performing the I-Q mismatch correction in pairs of tones.

4. The receiver of claim 3, wherein the equalization and I-Q mismatch correction circuit is further for performing the I-Q mismatch correction in pairs of image tones, each tone being equalized and I-Q mismatch corrected together with its image tone.

5. The receiver of claim 3, wherein the equalization and I-Q mismatch correction circuit is further for performing both frequency domain equalization and I-Q mismatch correction on frequency domain samples being output by the Fourier transform circuit that are classified as having frequency dependent I-Q mismatch.

6. The receiver of claim 5, wherein the frequency domain samples corresponding to tones within a predetermined range of a cutoff frequency of a filter of the demodulator are classified as having frequency dependent I-Q mismatch.

7. The receiver of claim 3, wherein the equalization and I-Q mismatch correction circuit is further for performing only frequency domain equalization on frequency domain samples being output by the Fourier transform circuit that are classified as having frequency independent I-Q mismatch.

8. The receiver of claim 1, wherein the equalization and I-Q mismatch correction circuit comprises:

a first multiplier being coupled to an $i^{th}$ frequency domain sample from the Fourier transform circuit for multiplying the $i^{th}$ frequency domain sample with a first correction factor;

a complex conjugate unit being coupled to an $(N-i)^{th}$ frequency domain sample from the Fourier transform circuit for calculating a complex conjugate of the $(N-i)^{th}$ frequency domain sample, wherein N corresponds to the number of frequency domain samples being output by the Fourier transform circuit;

a second multiplier being coupled to complex conjugate unit for multiplying the output of the complex conjugate unit with a second correction factor; and an adder being coupled to the first multiplier and the second multiplier for summing the outputs of the first multiplier and the second multiplier to thereby generate an output value being both frequency domain equalized and I-Q mismatch corrected for the $i^{th}$ frequency domain sample.

9. A method of processing a received signal in a receiver, the method comprising:

demodulating both an in-phase (I) component and a quadrature-phase (Q) component of the received signal to thereby generate I and Q time-domain serial data;

converting the time-domain serial data to a plurality of time-domain parallel data;

generating frequency domain samples from the time-domain parallel data;

performing both frequency domain equalization and I-Q mismatch correction on at least one of the frequency domain samples; and performing the I-Q mismatch correction on a per-tone basis;

wherein each particular tone has respective frequency domain equalization coefficients to correct the respective channel distortion and I-Q mismatch experienced by the particular tone.

10. The method of claim 9, wherein the step of performing both frequency domain equalization and I-Q mismatch correction further comprises:

performing both frequency domain equalization and I-Q mismatch correction on at least one of the frequency domain samples with four degrees of freedom being amplitude change and phase shift caused by channel distortion, and amplitude mismatch and phase mismatch caused by I-Q mismatch.

11. The method of claim 9, further comprising performing the I-Q mismatch correction in pairs of tones.

12. The method of claim 11, further comprising performing the I-Q mismatch correction in pairs of image tones, each tone being equalized and I-Q mismatch corrected together with its image tone.

13. The method of claim 11, further comprising performing both frequency domain equalization and I-Q mismatch correction on frequency domain samples being output by a Fourier transform circuit that are classified as having frequency dependent I-Q mismatch.

14. The method of claim 13, further comprising classifying frequency domain samples corresponding to tones within a predetermined range of a cutoff frequency of a filter in a demodulator of the receiver as having frequency dependent I-Q mismatch.

15. The method of claim 11, further comprising performing only frequency domain equalization on frequency domain samples being output by a Fourier transform circuit that are classified as having frequency independent I-Q mismatch.

* * * * *